United States Patent [19]

Watts

[11] Patent Number: 4,824,326
[45] Date of Patent: Apr. 25, 1989

[54] AUTOGYRO

[75] Inventor: James A. Watts, Colchester, England

[73] Assignee: Property Associates Limited, Colchester, England

[21] Appl. No.: 55,232

[22] Filed: May 28, 1987

[51] Int. Cl.⁴ ............................................. B64C 27/52
[52] U.S. Cl. ..................................... 416/102; 416/148
[58] Field of Search .................... 416/102, 148, 123; 244/8, 17.25

[56] References Cited

U.S. PATENT DOCUMENTS

| | | | |
|---|---|---|---|
| 2,102,028 | 12/1937 | Prewitt | 416/148 |
| 2,111,804 | 3/1938 | Page | 416/148 |
| 2,273,051 | 2/1942 | Larsen | 416/148 |
| 2,491,733 | 12/1949 | Hiller | 416/102 |
| 2,944,610 | 7/1960 | Gluhareff | 416/148 X |
| 3,233,679 | 2/1966 | Strydom | 416/102 X |
| 3,426,982 | 2/1969 | Markwood | 416/148 X |
| 3,554,467 | 1/1971 | Yowell | 416/102 X |

FOREIGN PATENT DOCUMENTS

| | | | |
|---|---|---|---|
| 662752 | 12/1951 | United Kingdom | 416/102 |
| 925301 | 5/1963 | United Kingdom | 416/102 |

Primary Examiner—Everette A. Powell, Jr.
Attorney, Agent, or Firm—Oldham & Oldham

[57] ABSTRACT

An autogyro has rotor blades carried by a rotor head mounted on a support member (10) rotatable about a pitch axis (18) and independently rotatable about a roll axis (22) for control of the autogyro in pitch and roll respectively. The pitch and roll axes intersect one another in order to overcome the problem of rotation about one axis affecting the radius of rotation about the other axis. Means are provided to prevent rotation of the rotor head and support member about an axis orthogonal to both the pitch and roll axes.

8 Claims, 3 Drawing Sheets

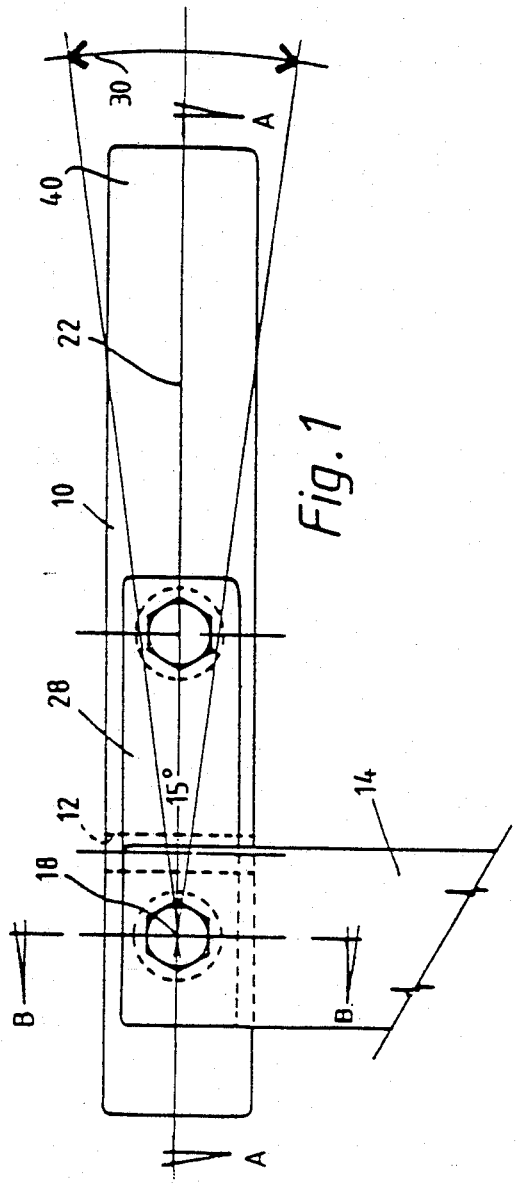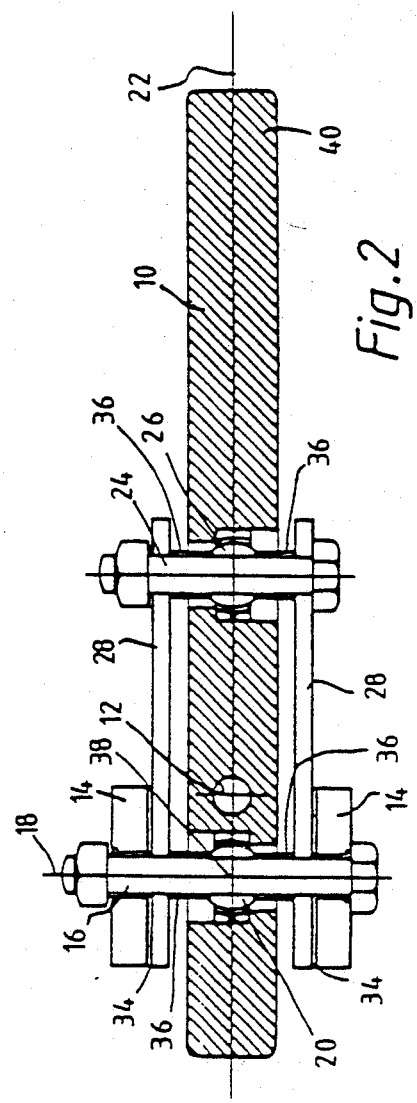

AUTOGYRO

FIELD OF THE INVENTION

This invention relates to light aircraft known as gyroplanes or autogyros. Such aircraft have a main engine to provide thrust and rotor blades mounted so as to be capable of pivotal motion about pitch and roll axes, under the control of the pilot, to control the aircraft.

BACKGROUND TO THE INVENTION

In a conventional autogyro the pitch axis of the rotor blades is spaced from the roll axis of the rotor blades so that rotation of the blades in the pitch sense alters the radius of rotation of the blades in the roll sense, and rotation of the blades in the roll sense alters the radius of rotation of the blades in the pitch sense. This is known as lozenging, a problem which the present invention aims to solve.

SUMMARY OF THE INVENTION

According to the invention an autogyro comprises a rotor head supporting rotor blades, the rotor head being rotatable about a pitch axis and independently rotatable about a roll axis for control of the autogyro in pitch and roll respectively, the pitch and roll axes being orthogonal and intersecting one another, and restraining means for preventing rotation of the rotor head about an axis orthogonal to both the pitch and roll axes. In the inventive autogyro the pitch and roll axes are therefore coplanar so that the radius of rotation in pitch and roll remains constant. As a result, a certain amount of turn applied by the pilot about the pitch or roll axis will always result in the same amplitude of angular movement of the rotor blades in pitch or roll. The constraining means ensure that the rotor head has the required degree of freedom to pivot in pitch and roll, without pivoting about the axis which is perpendicular to the plane containing the pitch and roll axes.

The rotor head is preferably mounted on a movable support member which is supported in a frame of the autogyro by support means, so that the support member is capable of rotation about the pitch and roll axes, the support member being coupled to push rods by which the pilot controls the autogyro in pitch and roll. The support means may comprise a pivot rod which defines the pitch axis and on which the support member is mounted by a spherical bearing allowing rotation of the support member about the pitch and about the roll axis.

The restraining means preferably comprise at least one bar which is constrained to extend parallel to the roll axis and which prevents the support member pivoting about an axis orthogonal to the pitch and roll axes, the bar being capable of pivotal movement about the pitch axis with the support member. In the preferred embodiment the constraining means additionally comprise a second pivot rod which extends through the support member and on which the other end of each bar is pivotally mounted, and a second spherical bearing by which the support member is mounted on the second pivot rod, the bars interconnecting the first pivot rod and the second pivot rod in order to maintain the first and second pivot rods parallel to one another and perpendicular to the roll axis.

The invention will now be further described, by way of example, with reference to the accompanying drawings which show the way in which the preferred support member is mounted to have the requisite degrees of freedom to pivot about the pitch and roll axes. In the drawings:

FIG. 1 is a side view of the support member and associated structure,

FIG. 2 is a sectional view on the line A—A of FIG. 1,

DETAILED DESCRIPTION OF THE DRAWINGS

Figure 4:
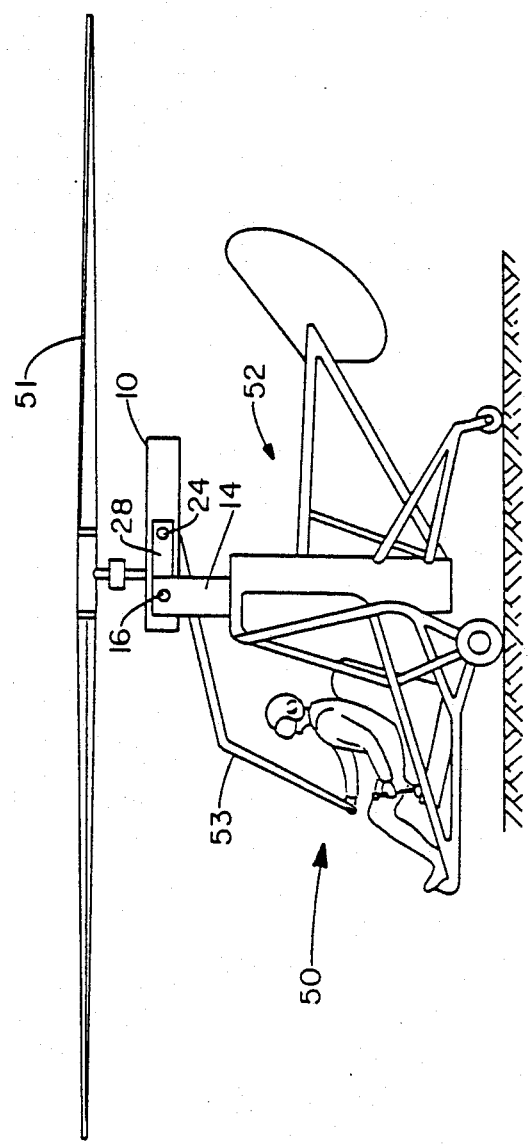
FIG. 4 is a side view of the Autogyro showing the support member associated therewith.

Referring now to the figures, the autogyro 50 utilizes a support member 10 in the form of an elongated block which has a through bore 12 for the mounting of a rotor head carrying conventional autogyro rotor blades 51 as shown in FIG. 4.

The support member 10 is mounted between two spaced head plates 14 which are connected to the mast of the autogyro and may therefore be regarded as secured to the fixed frame of the autogyro 50. A transverse pivot rod 16 spans the head plates 14 and defines the pitch axis 18. One end of the support member 10 is supported on the pivot rod 16 through the intermediary of a spherical bearing 20. The bearing 20 enables the support member 10 to rotate about the pitch axis 18 and also about a roll axis 22 which is orthogonal to the pitch axis 18 and which extends longitudinally through the support member 10.

Figure 3:
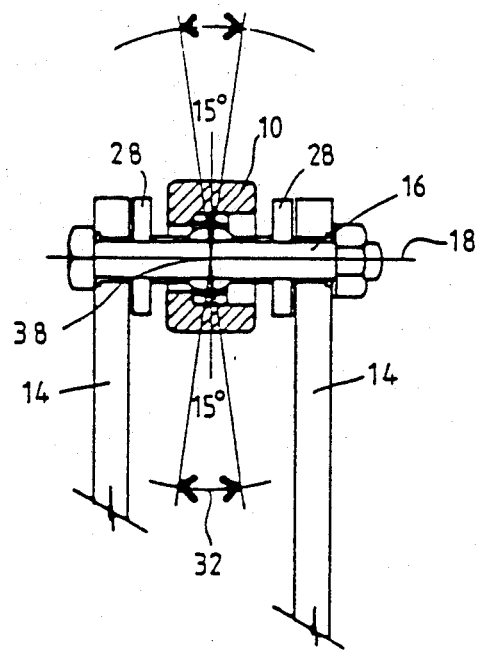
FIG. 3 is a sectional view on the line B—B of FIG. 1.

A second pivot rod 24 extends through the support member 10 at a location spaced rearwardly from the first pivot rod 16. The support member 10 is mounted on the second pivot rod 24 by a second spherical bearing 26. The second pivot rod 24 is constrained to remain parallel to the first pivot rod 16 (and therefore to the pitch axis) by two bars 28 which interconnect the pivot rods 16 and 24 on respective sides of the support member 10. The bars 28 are capable of pivotal movement with respect to the first pivot rod 16, with the result that the bars 28 and the second pivot rod 24 swing about the pitch axis 18 when the support member moves about the pitch axis in the rotational plane indicated by the arrows 30 in FIG. 1. When the support member 10 rotates about the roll axis 22, as indicated by the arrows 32 in FIG. 3, the bars 28 do not rotate but remain against the head plates 14.

It will be appreciated that the bars 28, the second pivot rod 24 and the second spherical bearing 26 act as constraining means which prevent the support member 10 rotating other than about the pitch axis 18 and/or the roll axis 22, ie they prevent the support member 10 rotating about the axis which is orthogonal to the pitch axis 18 and the roll axis 22.

Antifriction discs 34 are interposed between the bars 28 and the head plates 14 and appropriate spacer sleeves 36 are provided between the bars 28 and the respective spherical bearings 20 and 26.

It can be seen from the drawings that the pitch axis 18 and the roll axis 22 always intersect at the center point of the pivot rod 16, this centre point being indicated at 38.

The bore 12 is offset from the point 38, so that the rotor head is mounted on the support member 10 at a location intermediate the two pivot rods 16 and 24. The rotor head may be mounted at any other convenient location along the length of the support member 10, and the latter may carry drive means for spinning the rotor blades up to speed.

When the pilot of the autogyro moves the push rods 53 (which are attached to the end 40 of the support member 10) in pitch or roll, or in any combination of pitch and roll, the support member 10 and the rotor blades supported thereby rotate about a constant radius centered on the pitch axis 18 for motion in the pitch sense, and about a constant radius centered on the roll axis 22 for motion in the roll sense.

It will be noted from FIG. 2 that the spherical bearings 20 and 26 are inserted into the support member 10 from opposite sides, so as to retain the member 10 in its centered position.

I claim:

1. In an autogyro having a rotor head supporting rotor blades, an autogyro pitch and roll control means comprising:

a support for the rotor heads;

a spherical bearing on which the rotor head support is mounted;

means for rotating the rotor head support about a pitch axis through the center of the spherical bearing for pitch control of the autogyro;

means operational independently of the pitch axis rotating means for rotating the rotor head support about a roll axis through the center of the spherical bearing orthogonal to the pitch axis and for roll control of the autogyro; and restraining means acting to prevent rotation of the rotor head support about an axis orthogonal to both the pitch and roll axes, including the orthogonal axis through the center of the spherical bearing.

2. An autogyro according to claim 1, wherein the rotor head is mounted on a movable support member which is supported in a frame of the autogyro by support means so as to be capable of rotation about the pitch and roll axes, the support member being coupled to push rods by which the pilot controls the autogyro in pitch and roll.

3. An autogyro according to claim 2, wherein the support means comprise a pivot rod which defines the pitch axis and on which the support member is mounted by the spherical bearing allowing rotation of the support member about the pitch axis and about the roll axis.

4. An autogyro according to claim 3, wherein the restraining means comprise at least one bar which is capable of pivotal movement about the pitch axis with the support member and which is constrained to extend parallel to the roll axis and to prevent the support member pivoting about an axis orthogonal to the pitch and roll axes.

5. An autogyro according to claim 4, wherein the bar is one of two such bars which extend on respective sides of the support member.

6. An autogyro according to claim 5, wherein one end of each bar is pivotally mounted on the pivot rod defining the pitch axis.

7. An autogyro according to claim 6, wherein the restraining means additionally comprise a second pivot rod which extends through the support member and on which the other end of each bar is pivotally mounted, and a second spherical bearing by which the support member is mounted on the second pivot rod, the bars interconnecting the first pivot rod and the second pivot rod in order to maintain the first and second pivot rods parallel to one another and perpendicular to the roll axis.

8. An autogyro according to claim 1, wherein the rotor head is mounted on the support member at a location intermediate the first pivot rod and the second pivot rod.

* * * * *